United States Patent [19]
Mark

[11] Patent Number: 5,011,048
[45] Date of Patent: Apr. 30, 1991

[54] LIQUID DISPENSING MEASURING CAP

[76] Inventor: Alexander D. Mark, 50 Park Ave., Passaic, N.J. 07055

[21] Appl. No.: 492,404

[22] Filed: Mar. 8, 1990

Related U.S. Application Data

[63] Continuation of Ser. No. 215,250, Jul. 6, 1988, abandoned.

[51] Int. Cl.⁵ ............................................. G01F 11/26
[52] U.S. Cl. ..................................... 222/455; 222/562
[58] Field of Search ....................... 222/455, 454, 562

[56] References Cited

U.S. PATENT DOCUMENTS

| | | | |
|---|---|---|---|
| 1,938,100 | 12/1933 | Gessler | 222/455 |
| 2,021,004 | 11/1935 | Garrido | 222/455 |
| 2,752,076 | 6/1956 | Locker | 222/455 |
| 2,834,519 | 5/1958 | Miller | 222/455 |
| 3,710,989 | 1/1973 | Armour | 222/562 |

FOREIGN PATENT DOCUMENTS 492973 4/1954 Italy .

Primary Examiner—Robert P. Olszewski
Assistant Examiner—Kenneth Noland

[57] ABSTRACT

A removable cap for dispensing liquids in pre-measured quantities from a liquid-filled container including an elongated tubular member having a bottom end adapted to be fastened to said liquid-filled container and an open top end through which a pre-measured quantity of liquid is discharged, a spout formed internal to and as an integral part of the tubular member with an opening through which liquid may pass from the container and a cover pivotally connected to the tubular member and having a closed position and an open position. The cover includes an extnding member shaped to form a collection chamber when the cover is in the closed position.

8 Claims, 4 Drawing Sheets

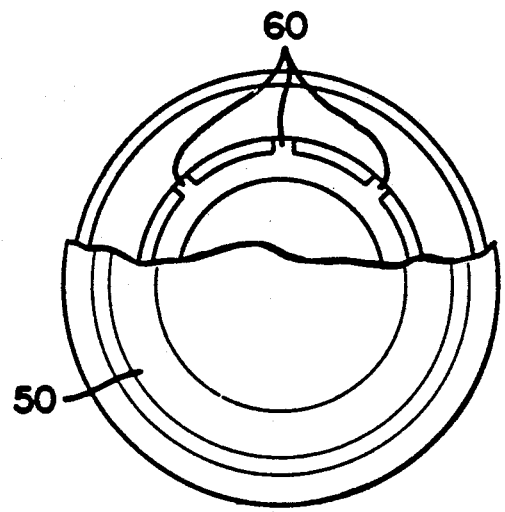
FIG. 5
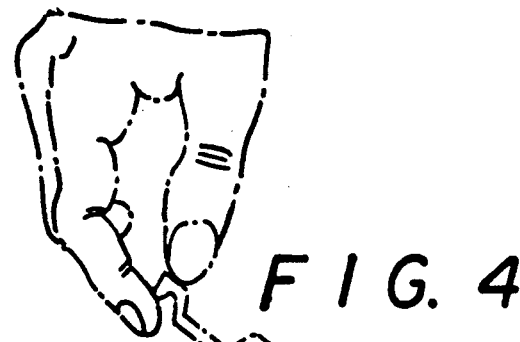
FIG. 4
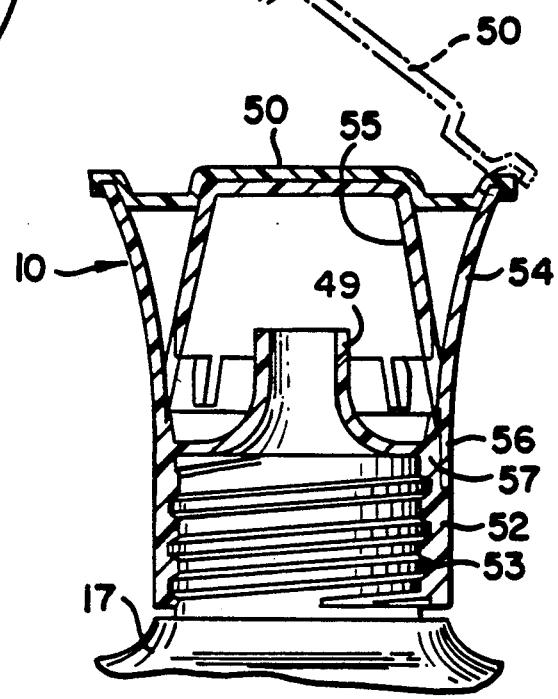
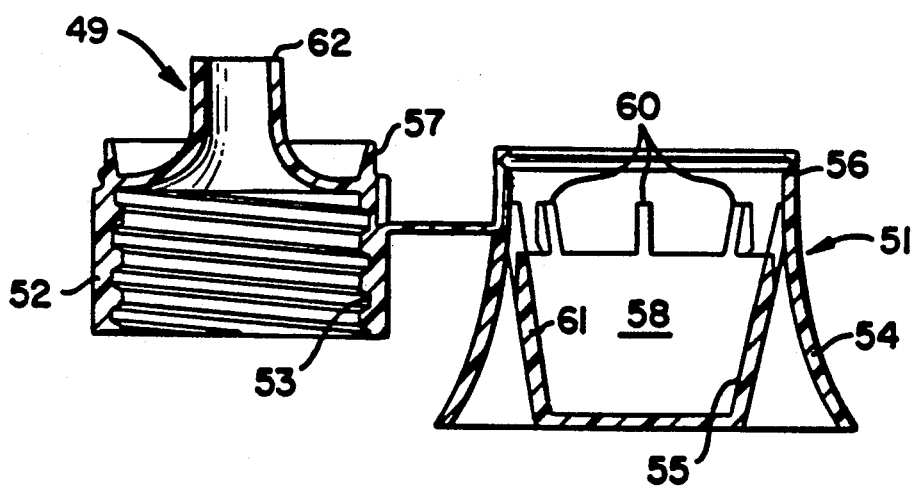
FIG. 7
FIG. 6

LIQUID DISPENSING MEASURING CAP

This application is a continuation of prior U.S. application Ser. No. 215,250, filed July 6, 1988, now abandoned.

FIELD OF INVENTION

The invention relates to a device for dispensing liquids from a liquid container and more particularly to an improved dispensing device in the form of a cap adapted for attachment to a container to control the discharge of fluid from the container in pre-measured dosages.

BACKGROUND OF INVENTION

Many products are packaged for sale to the consumer in liquid form with directions requiring the consumer to discharge the contents in fixed dosages in accordance with a given relationship or prescription. Typical of such products are liquid detergents, gasoline additives and liquid medicaments. Liquid medications include directions for the patient to carefully measure out a fixed quantity of the medicament in accordance with a given prescription. The latter procedure is difficult for certain age groups to comprehend, such as, for example, the elderly, young children, and the physically and mentally handicapped. Elderly people have difficulty manipulating the container to dispense a controlled quantity, whereas younger children and the mentally handicapped may misinterpret the directions.

Devices which attach to a container for dispensing a pre-measured dosage of fluid are not new. One such device is described in U.S. Pat. No. 2,760,692 issued to W. Buehlig on Aug. 28, 1956. The Buehlig patent discloses a dispenser designed as an attachment for a container to permit a pre-measured dosage of liquid to be dispensed from the container. It is essential to the design of the Buehlig device that the dispenser be large relative to the size of the container in order to be able to collect a reasonable volume of pre-measured liquid. This makes for a verY unattractive product. The design is also cumbersome and unwieldY. Moreover, the Buehlig design does not lend itself to mass production techniques and is accordingly expensive to manufacture. The Buehlig design, as well as other prior art dispensing attachments, have been relegated to novelty items, primarily for sale with liquor bottles.

SUMMARY OF THE INVENTION

The liquid dispensing measuring cap of the present invention overcomes the disadvantages in design of the prior art and provides a design which may readily be mass produced. In accordance with the teachings of the present invention, the liquid dispensing cap is designed to be injection molded, preferably as a single unit, and comprises a tubular member adapted for attachment to the liquid-filled container, a spout formed internal to said tubular member, and a cover pivotally connected to said tubular member and having a closed position and an open position, with said cover having means extending therefrom for forming in said closed position a collection chamber aligned in juxtaposition with said spout to pre-measure a fixed quantitY of liquid into said chamber and having a pouring spout through which the pre-measured liquid in said collection chamber is discharged from the cap.

OBJECTS AND BRIEF DESCRIPTION OF THE DRAWINGS

It is therefore the principal object of the present invention to provide a liquid dispensing measuring cap of universal design, for attachment to any liquid container for discharging a fixed quantity of liquid from the container, which is relatively inexpensive to manufacture and which gives wide latitude to the designer to provide an attractive product.

Other objects and advantages of the present invention will become apparent from the following detailed description of the invention when read in conjunction with the following drawings:

FIG. 4 is an alternative embodiment of the liquid dispensing measuring cap of the present invention shown in cross section;

FIG. 5 is a top view of the cap of FIG. 4 with part of the top cut away for exposing the circumferentially arranged discharge openings;

FIG. 6 is yet another cross-sectional view of the cap of FIG. 4 showing the cover in its open position;

FIG. 7 is another alternative embodiment of the liquid dispensing measuring cap of the invention, shown in cross section;

DETAILED DESCRIPTION OF THE INVENTION

Figure 2:
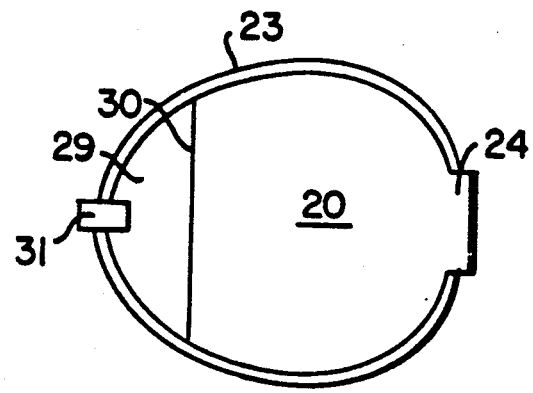
FIG. 2 is a top view of the liquid dispensing measuring cap of FIG. 1.
Figure 1:
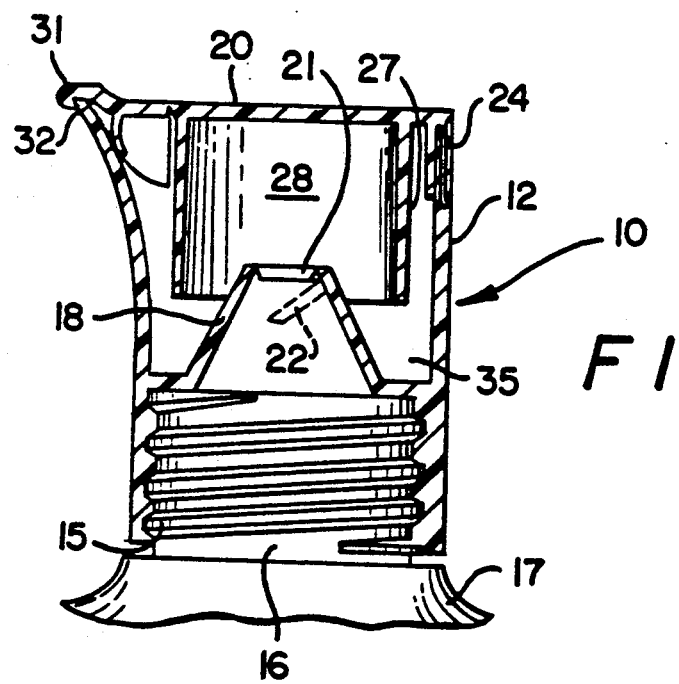
FIG. 1 is a cross-sectional view of the liquid dispensing measuring cap of the present invention shown in an attached position to the open neck of a container adapted to hold a liquid.
Figure 3:
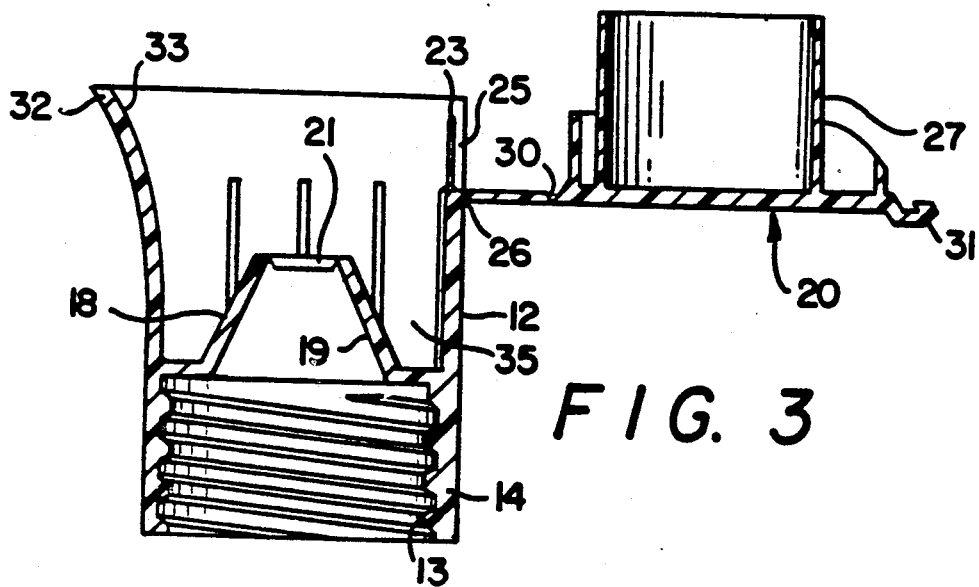
FIG. 3 is another cross-sectional view of the cap of FIG. 1 with the cover shown in the open extended position.

The basic features of the liquid dispensing measuring cap of the present invention is shown in the embodiment of FIGS. 1–3, respectively. The liquid dispensing measuring cap is identified by the reference numeral 10 and consists of a hollow tubular member (12) of any desired geometrical shape, having internal threads (13) formed along the bottom end (14) for attachment to complementary threads (15) disposed about the neck (16) of a commercial container (17) of a predetermined size corresponding to the size of the cap (10). The container (17) is filled with a liquid (not shown) to be dispensed through the cap (10). A spout (18) is formed internal to the tubular member (12) and as an integral part thereof, preferably by means of injection molding in which the entire measuring cap is preferably molded in one piece. The spout (18) may be of any desired configuration, with the conical shape shown in FIG. 1 being preferred. The conical geometry of the spout (18) forms a tapered wall (19) which terminates in a central opening (21). A temporary plug or seal (22) may be used to close off the opening (21).

The cap (10) includes a cover (20) which is pivotally connected to the tubular member (12) through a hinge (24). The hinge (24) may be formed by providing an instep (25) in the tubular member (12) at its top end (23) with the cover (20) connected to the cap (10) at the hinge point (26) so that the cover may extend outwardly from the tubular member (12) in the open position and pivot flush against the tubular member (12) in the closed position. The cap (10) is preferably injection-molded with the cover (20) in the open position shown in FIG. 3, thereby permitting the entire cap to be formed in one piece. Alternatively the cover (20) may be fabricated separate from the tubular member (12) and hinged to the tubular member using any conventional hinge arrangement such as, for example, by means of a hinge pin (not shown). The pivotal connection between the cover (20) and the tubular member (12) is necessarY to permit the internal spout (18) to be injection-molded with the tubular member (12) as one piece while allowing for the simultaneous injection molding of the cover (20). Moreover, with the cover (20) in the open position, as shown in FIG. 3, liquid may also be freely discharged through the spout (18) when pre-measured dosages are not required. The cap (10) may be formed from any suitable material and preferably is of an elastomeric composition.

The cover (20) has a depending projection (27) which forms a collection chamber (28), when the container (17) and cap (10) are turned upside down, for pre-measuring a controlled dosage of liquid to be dispensed through the spout (18) from the container (16). The incorporation of a collection chamber (28) in the pivotally connected cover (20) assures symmetry between the spout (18) and the projection (27) and provides control in the design over the volume of liquid to be pre-measured as well as simplifying the manufacture of the cap (10). The projection (27) is preferably cylindrical in shape and coaxial with the spout (18). If desired, the projection (27) may be off centered. The shape of the cover (20) is not material and, as such, any shape is acceptable provided the top end (23) of the tubular member is compatible in shape. Accordingly, the cover (20) can be elliptical in shape as is shown in FIG. 2, provided the top end (23) of member (12) is also elliptically shaped to permit the cover (20) in the closed position to close off the container (17). The cover (20) is also preferably formed with a secondary flap (29) which is pivotally hinged to the cover (20) at (30). The flap (29) desirably has a snap open lip (31) for engaging and disengaging the curved end (32) of the tubular member (12). When the flap (29) is opened, the curved end (32) forms a pouring spout (33) to discharge pre-measured liquid from the cap (10).

The operation of the device is relatively simple. The measuring cap (10) is attached to a liquid-filled container (17), as shown in FIG. 1. The container (17) is turned over to permit liquid to flow through the spout (18) into the collection chamber (28) where the liquid rises in the chamber (28) to a level slightly above the opening (21) of the spout (18). The level to which the liquid rises in the collection chamber (28) is controlled by the net hydrostatic pressure forces in the overturned position. The volume of liquid collected in the collection chamber (28) is based upon the position of the open end (21) of the spout (18) relative to the chamber (28) and the diameter of the collection chamber (28). Once the collection chamber (28) is filled, the container (16) is then turned right side up. The pre-measured liquid collected in the collection chamber (28) will fall into a reservoir (35) surrounding the spout (18) from whence the liquid may be poured through the pouring spout (33) by opening the flap (29) and tilting the container (16) relative to the spout (33). The orientation of the collection chamber (28) can be along any axis, although a coaxial arrangement with the spout (18) is preferred. The collection chamber (28) may have any desired geometrical shape and does not have to be symmetrical with the spout (18), although a symmetrical arrangement is preferred.

Alternative embodiments of the invention are shown in FIGS. 4 through 13, inclusive. FIGS. 4, 5 and 6 relate to an embodiment permitting the pre-measured fluid in the collection chamber to be dispensed from the cap (10) in any direction over 360 degrees relative to the central longitudinal axis of the cap (10). The cap (10) has a removable lid (50), a cover (51) pivotally connected to a tubular member (52). The tubular member (52) has internal threads (53) to engage the neck of a standard threaded container (17) as described in connection with the embodiment of FIGS. 1-3. The tubular member (52) has a curved spout (49) extending from its upper end (57). The spout (49) is preferably molded with the member (52) in one piece with the cover (51) in the open position, as shown in FIG. 6. The cover (51) is hinged to the tubular member (52) at the upper end (57) in a manner corresponding to the hinged arrangement in the embodiment of FIG. 1. The cover (51) has a curvilinear shape extending radially outwardly 360 degrees from a central cylindrical end section (56) which mates with the tubular member (52) in the closed position to form a universal pouring spout (54) from which liquid may be poured upon tilting the container (17) in any inclined position relative to the vertical. The cover (51) also has a generally conically shaped extension (55) projecting from its cylindrical end (56). The extension (55) forms a collection chamber (58) into which a pre-measure of liquid from the container (17) may be collected by turning the container (17) over. The shape of the extension (55) is not critical to the present invention. A plurality of openings (60) are arranged circumferentially about the extension (55) which permit the liquid collected in the collection chamber (58) to be dispensed from the cap (10) in any direction by simply tilting the cap (10) into a desired dispensing position. The extension (55) preferably has inclined walls (61), but this is not critical. The internal spout (49) has a cylindrical mouth (62), but may be formed into any desired geometry.

FIG. 7 shows another cap embodiment having a cover (65) shaped to form a semi-hemispherical well (66) which functions as the collection chamber for collecting a pre-measure of liquid from the container (not shown). The container would be threadably connected to the tubular member (12) which is, in turn, pivotally connected to the cover (65) in a similar manner corresponding to the embodiment of FIGS. 1-3 or FIGS. 4-6, respectively.

Figure 8:
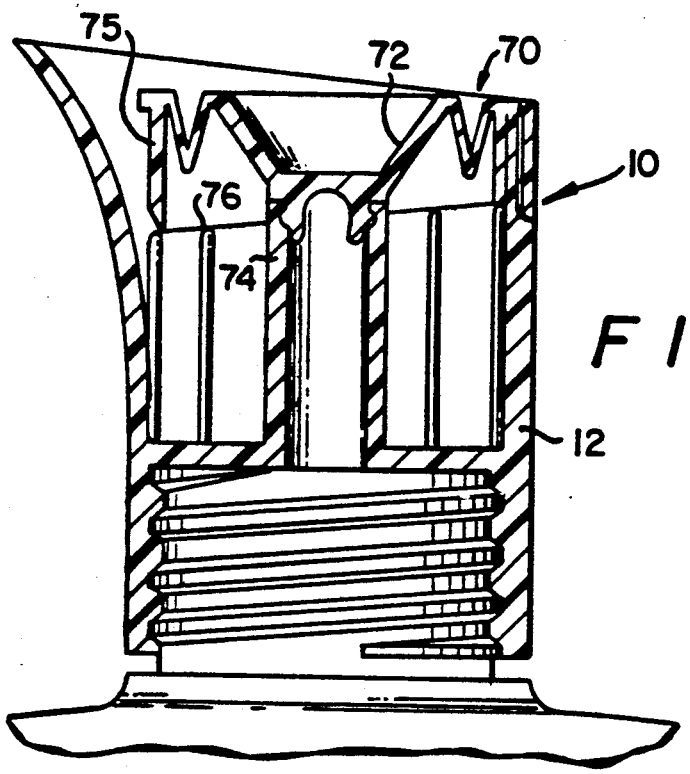
FIG. 8 is another embodiment of the liquid dispensing measuring cap of the present invention.
Figure 9:
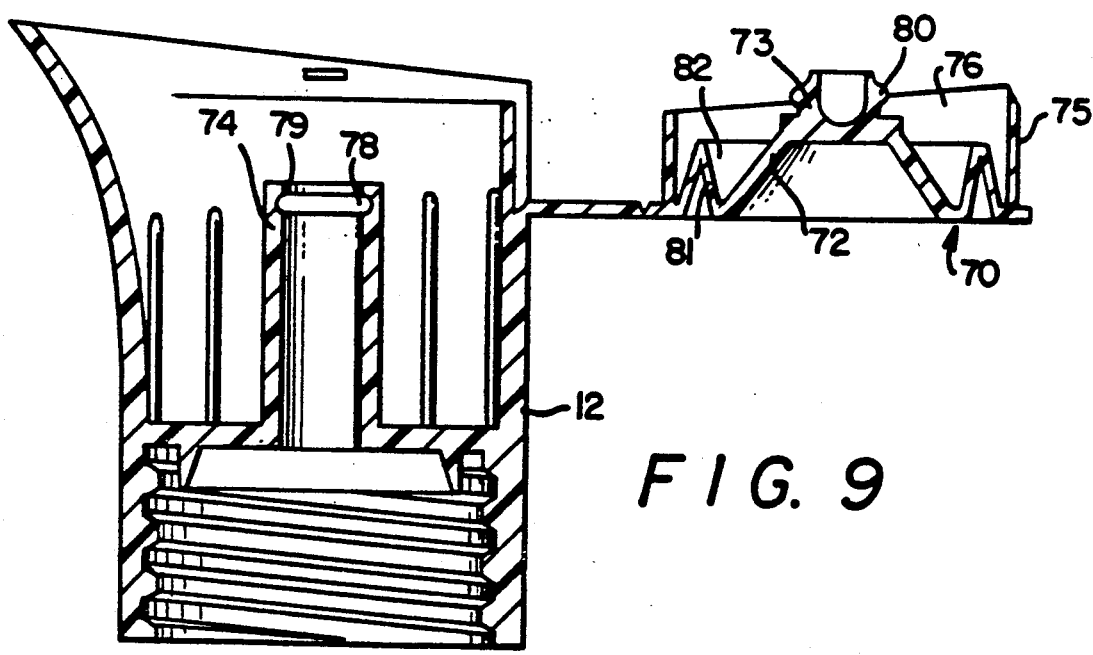
FIG. 9 shows the cap of FIG. 8 with the cover in the open position.
Figure 13:
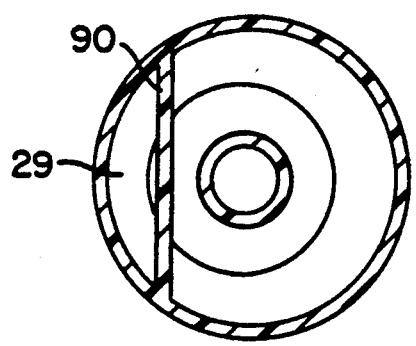
FIG. 13 is a top view of the cap of FIG. 12.

FIGS. 8 and 9 shown yet another embodiment of the cap (10) of the present invention having a cover (70) pivotally connected to a tubular member (12) functionally corresponding to the tubular member (12) of FIGS. 1-3. The cover (70) has a valve member (72) which engages the internal spout (74) of the cap (10) when the cover is in the closed position. The cover (70) also includes a tubular projection (75) which forms the collection chamber (76) for the cap (10). In FIG. 9, the cover (70) is shown in the open position with the valve member (72) separated from the internal spout (74). The internal spout (74) is preferably of cylindrical configuration with a slot (78) at the open end (79). The slot (78) is adapted to receive an annular dimple (80) projecting from a flexible extension (73) of the valve member (72) which permits the valve member (72) to be locked in place with the cover (70) in the closed position. The valve member (72) has a rippled annular rib (81) which forms a channel (82) to give the valve member (72) increased flexibility for engaged and disengaging the internal spout (74).

Figure 12:
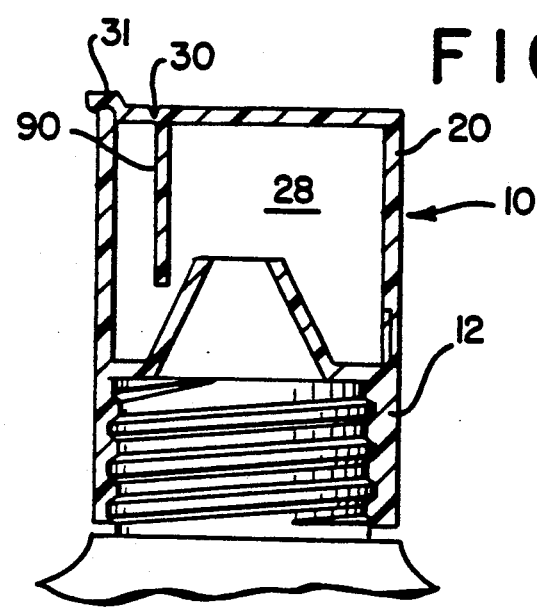
FIG. 12 shows a simplified variation of the cap of FIG. 10.
Figure 11:
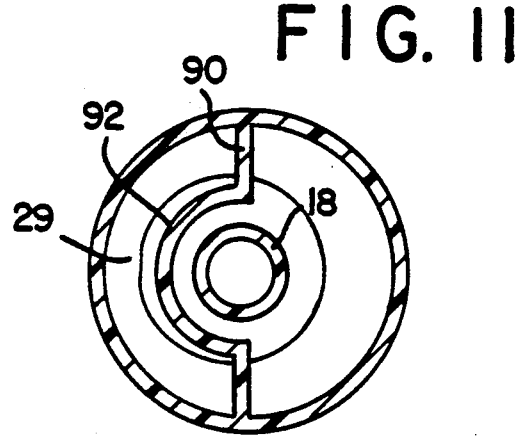
FIG. 11 is a top view of the cap of FIG. 10.
Figure 10:
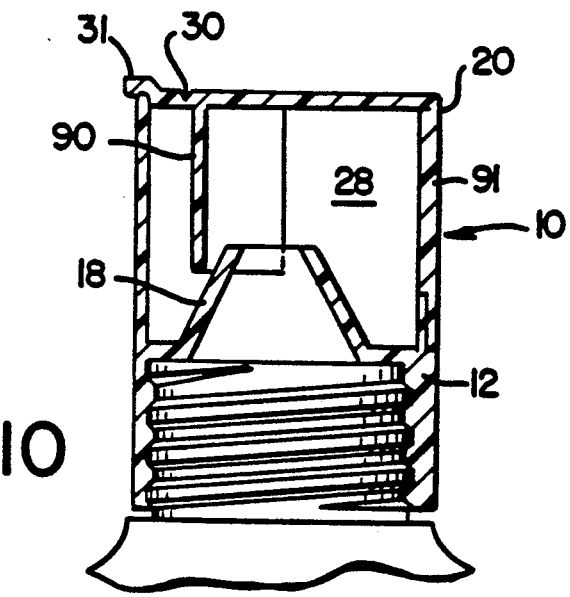
FIG. 10 is yet another embodiment of the liquid dispensing measuring cap of the present invention.

FIGS. 10 and 11 show an alternate embodiment for the liquid dispensing measuring cap (10) of FIGS. 1-3. The hollow tubular member (12) corresponds to the hollow tubular member (12) of FIG. 1, and is integrally formed in one piece with an internal spout (18) by injection molding with the cover (20) in the open position (not shown), as discussed heretofore in connection with FIG. 1. The cover (20) is pivotally connected to the tubular member (12) in a manner corresponding to the arrangement of FIG. 1. In contrast to FIG. 1, the cover (20) has a depending member (90) which functions as a dividing wall to form the collection chamber (28). The depending member (90) uses the outer wall surface (91) of the cover (20) to form the collection chamber (28). The depending member (90) may have any desired shape, thereby providing flexibility in sizing the chamber (28) during manufacture to satisfy a given application. In FIG. 10, the depending member (90) has a curved semicircular section (92). In FIG. 12, which is a variation of FIG. 10, the depending member (90) is a straight wall divider. The embodiments of FIGS. 10-13 include a secondary flap (29) similar to its counterpart in FIG. 2 which is pivotally hinged to the cover (20) at (30) and a snap open lip (31).

What we claim is:

1. A removable cap for dispensing liquids in pre-measured quantities from a liquid-filled container comprising an elongated member forming an internal spout having a bottom end adapted to be fastened to said liquid-filled container, an open top end through which a pre-measured quantity of liquid is discharged and wall means extending from the bottom end of such member for forming an open annular reservoir around said internal spout, a removable cover connected to said wall means, with said cover having a closed position and an open position and means projecting from said cover for forming a collection chamber, with said collection chamber extending from said cover a distance sufficient to overlap the open top end of said internal spout when said cover is in the closed position for collecting a pre-measured quantity of liquid when said cap and container is turned upside down, and means in said cover for forming an outer spout, with said outer spout located on the periphery of said cap and laterally offset from the open top end of said internal spout whereby the liquid collected in said collection chamber is dispensed through said outer spout when the cap and container is at least partially turned right side up for discharging the liquid through the outer spout.

2. A removable cap as defined in claim 1 wherein said collection chamber is aligned in substantial juxtaposition with said internal spout.

3. A removable cap as defined in claim 2 wherein the bottom end of said member is internally threaded for connection to corresponding threads of a standard container.

4. A removable cap as defined in claim 2 wherein said cover includes a valve member for engaging said internal spout in the closed position.

5. A removable cap as defined in claim 1 wherein said means extending from said cover has an inverted "U" shaped geometry and a plurality of circumferentially arranged openings for universal pouring through the open top end of said tubular member.

6. A removable cap as defined in claim 1 wherein said means extending from said cover is an extension of said cover in a semi-hemispherical configuration for forming the collection chamber.

7. A removable cap as defined in claim 1 wherein said collection chamber is aligned nonsymmetrically relative to said internal spout.

8. A removable cap as defined in claim 1 wherein said cover is connected to said wall means at a single hinge point about which said cover pivots.

* * * * *